(12) United States Patent

Kamble

(10) Patent No.: US 10,148,697 B2
(45) Date of Patent: Dec. 4, 2018

(54) UNIFIED HOST BASED SECURITY EXCHANGE BETWEEN HETEROGENEOUS END POINT SECURITY AGENTS

(71) Applicant: Avocado Systems Inc., San Jose, CA (US)

(72) Inventor: Keshav Govind Kamble, San Jose, CA (US)

(73) Assignee: AVOCADO SYSTEMS INC., San Jose, CA (US)

( * ) Notice: Subject to any disclaimer, the term of this patent is extended or adjusted under 35 U.S.C. 154(b) by 154 days.

(21) Appl. No.: 15/184,956

(22) Filed: Jun. 16, 2016

(65) Prior Publication Data

US 2016/0373485 A1 Dec. 22, 2016

Related U.S. Application Data

(60) Provisional application No. 62/180,499, filed on Jun. 16, 2015.

(51) Int. Cl.
*G06F 21/51* (2013.01)
*H04L 29/06* (2006.01)

(52) U.S. Cl.
CPC ............ *H04L 63/20* (2013.01); *H04L 63/102* (2013.01)

(58) Field of Classification Search
None
See application file for complete search history.

(56) References Cited

U.S. PATENT DOCUMENTS

| 6,694,434 | B1 | 2/2004 | McGee et al. |
| 7,788,480 | B2 | 8/2010 | Winget et al. |
| 7,895,642 | B1 | 2/2011 | Larson et al. |
| 8,776,168 | B1 | 7/2014 | Gibson et al. |
| 9,077,617 | B1 | 7/2015 | Seth et al. |
| 9,094,407 | B1 | 7/2015 | Matthieu et al. |
| 9,338,181 | B1 | 5/2016 | Burns et al. |
| 9,349,015 | B1 | 5/2016 | Archer et al. |
| 9,491,107 | B1 | 11/2016 | Scudder et al. |
| 9,652,618 | B1 | 5/2017 | Lerner |

(Continued)

OTHER PUBLICATIONS

Final Office Action from U.S. Appl. No. 15/191,420, dated Aug. 14, 2018.

(Continued)

*Primary Examiner* — Fatoumata Traore
(74) *Attorney, Agent, or Firm* — Zilka-Kotab, P.C.

(57) ABSTRACT

In one embodiment, a system includes a processing circuit and logic integrated with and/or executable by the processing circuit. The logic is configured to cause the processing circuit to receive security results, using an application and data protection layer (ADPL) operating on a first host, from an end point protection agent (EPPA) configured to protect the first host. The logic is also configured to cause the processing circuit to provide the security results to one or more local applications operating on the first host. According to another embodiment, a method includes receiving security results, using an ADPL operating on a first host, from an EPPA configured to protect the first host. The method also includes providing the security results to one or more local applications operating on the first host. Other systems, methods, and computer program products are described in accordance with more embodiments.

14 Claims, 6 Drawing Sheets

(56) References Cited

U.S. PATENT DOCUMENTS

| | | | |
|---|---|---|---|
| 9,742,768 | B2 | 8/2017 | Cholas et al. |
| 9,952,790 | B2 | 4/2018 | Kamble |
| 9,954,578 | B2 | 4/2018 | Ehrensvard |
| 2003/0118185 | A1 | 6/2003 | Lambert |
| 2003/0140089 | A1 | 7/2003 | Hines et al. |
| 2004/0034767 | A1 | 2/2004 | Robinson et al. |
| 2006/0020814 | A1 | 1/2006 | Lieblich et al. |
| 2006/0069912 | A1* | 3/2006 | Zheng .......... H04L 63/0823 713/151 |
| 2007/0028090 | A1 | 2/2007 | Lopez et al. |
| 2007/0033642 | A1 | 2/2007 | Ganesan et al. |
| 2007/0129015 | A1 | 6/2007 | Iwamoto et al. |
| 2007/0239761 | A1 | 10/2007 | Baio et al. |
| 2007/0250923 | A1 | 10/2007 | M'Raihi |
| 2008/0115203 | A1 | 5/2008 | Elzur |
| 2009/0019535 | A1 | 1/2009 | Mishra et al. |
| 2009/0172402 | A1 | 7/2009 | Tran |
| 2009/0185687 | A1 | 7/2009 | Wankmueller et al. |
| 2009/0228970 | A1 | 9/2009 | Morimoto |
| 2009/0328194 | A1 | 12/2009 | Kim et al. |
| 2010/0037295 | A1 | 2/2010 | Oh et al. |
| 2010/0228964 | A1 | 9/2010 | Booth |
| 2010/0275026 | A1 | 10/2010 | McLean |
| 2011/0173699 | A1 | 7/2011 | Figlin et al. |
| 2011/0302624 | A1 | 12/2011 | Chen et al. |
| 2011/0321172 | A1 | 12/2011 | Maeda et al. |
| 2012/0051314 | A1 | 3/2012 | Goyal et al. |
| 2012/0096510 | A1 | 4/2012 | Bentall |
| 2012/0173875 | A1 | 7/2012 | Mahidhara et al. |
| 2012/0311614 | A1 | 12/2012 | DeAnna et al. |
| 2013/0179061 | A1 | 7/2013 | Gadh et al. |
| 2013/0191905 | A1 | 7/2013 | Harada et al. |
| 2014/0036662 | A1 | 2/2014 | Takeshima et al. |
| 2014/0051432 | A1 | 2/2014 | Gupta et al. |
| 2014/0237545 | A1 | 8/2014 | Mylavarapu et al. |
| 2014/0380484 | A1 | 12/2014 | Choi et al. |
| 2015/0134965 | A1 | 5/2015 | Morenius et al. |
| 2015/0172153 | A1 | 6/2015 | Sharma et al. |
| 2015/0213237 | A1 | 7/2015 | Kruglick |
| 2016/0080399 | A1* | 3/2016 | Harris .......... H04L 63/1416 726/23 |
| 2016/0191530 | A1 | 6/2016 | Jain et al. |
| 2016/0308904 | A1 | 10/2016 | Yoon et al. |
| 2016/0321452 | A1 | 11/2016 | Richardson et al. |
| 2016/0364163 | A1 | 12/2016 | Kamble |
| 2016/0366108 | A1 | 12/2016 | Kamble |
| 2016/0366142 | A1 | 12/2016 | Kamble |
| 2016/0366186 | A1 | 12/2016 | Kamble |
| 2016/0366187 | A1 | 12/2016 | Kamble |
| 2016/0381076 | A1 | 12/2016 | Kamble et al. |
| 2017/0006065 | A1 | 1/2017 | Kamble et al. |
| 2017/0019388 | A1 | 1/2017 | Kamble et al. |
| 2017/0053120 | A1 | 2/2017 | Kamble et al. |
| 2017/0230414 | A1 | 8/2017 | Kamble |
| 2018/0069862 | A1 | 3/2018 | Cholas et al. |
| 2018/0089429 | A1 | 3/2018 | Kamble |

OTHER PUBLICATIONS

Kamble, K., U.S. Appl. No. 15/181,275, filed Jun. 13, 2016.
Non-Final Office Action from U.S. Appl. No. 15/181,275, dated Dec. 8, 2017.
Younis, A., "Socket Data structures and How the TCP protocol works," CS457, Fall 2014, pp. 1-18 retrieved from http://www.cs.colostate.edu/-gersch/cs457/CS457 tutorial2.pdf.
Hall, B., "Beej's Guide to Network Programming Using Internet Sockets," May 3, 2001, pp. 1-47 retrieved from http://www.cs.columbia.edu/-danr/courses/6761 /Fall00/hw/pa1 /6761-sockhelp.pdf.
Kamble, K., U.S. Appl. No. 15/181,304, filed Jun. 13, 2016.
Notice of Allowance from U.S. Appl. No. 15/181,304, dated Dec. 15, 2017.
Kamble, K., U.S. Appl. No. 15/182,505, filed Jun. 14, 2016.
Non-Final Office Action from U.S. Appl. No. 15/182,505, dated Apr. 6, 2018.
Kamble, K., U.S. Appl. No. 15/182,544, filed Jun. 14, 2016.
Non-Final Office Action from U.S. Appl. No. 15/182,544, dated Mar. 16, 2018.
Kamble, K., U.S. Appl. No. 15/182,548, filed Jun. 14, 2016.
Non-Final Office Action from U.S. Appl. No. 15/182,548, dated Jun. 15, 2018.
Kamble et al., U.S. Appl. No. 15/191,420, filed Jun. 23, 2016.
Non-Final Office Action from U.S. Appl. No. 15/191,420, dated Mar. 22, 2018.
Kamble et al., U.S. Appl. No. 15/197,635, filed Jun. 29, 2016.
Non-Final Office Action from U.S. Appl. No. 15/197,635, dated May 11, 2018.
Kamble et al., U.S. Appl. No. 15/210,828, filed Jul. 14, 2016.
Non-Final Office Action from U.S. Appl. No. 15/210,828, dated Jun. 13, 2018.
Kamble et al., U.S. Appl. No. 15/243,854, filed Aug. 22, 2016.
Kamble, K., U.S. Appl. No. 15/275,239, filed Sep. 23, 2016.
Non-Final Office Action from U.S. Appl. No. 15/275,239, dated May 16, 2018.
Kamble, K., U.S. Appl. No. 15/424,749, filed Feb. 3, 2017.
Notice of Allowance from U.S. Appl. No. 15/181,275, dated Jul. 16, 2018.
Du, W., "SYN-Cookies Exploration Lab," Syracuse University, 2006, pp. 1-3.
Supplemental Notice of Allowance from U.S. Appl. No. 15/181,275, dated Sep. 6, 2018.
Non-Final Office Action from U.S. Appl. No. 15/424,749, dated Sep. 19, 2018.
Notice of Allowance from U.S. Appl. No. 15/182,544, dated Oct. 4, 2018.
Non-Final Office Action from U.S. Appl. No. 15/243,854, dated Oct. 5, 2018.
Supplemental Notice of Allowance from U.S. Appl. No. 15/181,275, dated Oct. 17, 2018.

* cited by examiner

UNIFIED HOST BASED SECURITY EXCHANGE BETWEEN HETEROGENEOUS END POINT SECURITY AGENTS

FIELD OF THE INVENTION

The present invention relates to network and system protection, and more particularly, this invention relates to security exchange between heterogeneous end point security agents.

BACKGROUND

Scaled-out, distributed applications are made up of a large number of application instances. These application instances have their own data in cache and memory of a processor on which these applications run. A large number of such application instances communicate with each other and process data in parallel to create an aggregate output.

These types of scaled-out applications are extremely vulnerable to application breaches, data thefts from cache and memory by scraping, and other methods of illicitly obtaining data from the applications, cache, and/or memory. In data centers which cater to important applications and data types, such as Personally Identifiable Information (PII), Payment Card Industry (PCI) data, medical information that falls under Health Insurance Portability and Accountability Act (HIPAA), military and Government critical tasks, any application and/or data breach is very destructive and expensive to contain and/or resolve. Therefore, it is beneficial to attempt to prevent such breaches.

Typically, application security in data centers is attempted by applying policies and rules at various levels using security appliances installed in the data center. However, in spite of providing layers of security appliances to create a security perimeter around the data center, malware and malicious software still enters inside the servers in the data center to steal data and attack applications.

In most cases of data breaches, data and application instances that utilize flows in the East-West (E-W) direction, i.e., communication between servers and application instances inside of the data center, are attacked. This is different from North-South (N-S) flows which are protected by conventional data security appliances. Since the edge of the data center where all the servers are connected is considered the safest place, many times, applications communicate with each other in clear data without protecting the data. A huge amount of data is shared across applications and application tiers in the E-W direction within the data center.

End point protection agents (EPPAs), such as those produced by INTEL's MCAFEE, SYMANTEC, KAPERSKY, etc., run on end points, hosts, or servers and monitor local security of the host or server. Each EPPA provides security through various built-in mechanisms, e.g., firewalls, antivirus applications, signature matching, etc. They also look at every executable file downloaded on the host or server and attempt to protect the operating system's registry key database and other important configurations which are crucial for secure functioning of the host or server. As part of its functionality, the EPPA also scans the hard disk or other direct access storage device (DASD) to look for the presence of unexpected programs. Using all of the above processes, EPPAs prepare a comprehensive report and a conclusion about the host or server they are installed on. When any abnormality, exception, etc., is found on the host or server, the EPPA attempts to fix the problem or flags the issue to the host or server owner.

However, all the applications which are running on that host or server are completely unaware of the underlying security profile or situation of the host or server, as the EPPA does not report such information to the applications. Even though the EPPA may find multiple security anomalies and risks associated with the host or server, the applications keep on running as if it is completely safe to do so. Therefore, any confidential or sensitive data used by the applications is still kept on the host or server.

Moreover, the security situation of one host or server is not known to the any other host or server in a data center or cluster, and thus any scaled-out applications running on multiple hosts or servers are exposed to whatever is affecting the one host or server, such as malware, which may lead to widespread application and data breaches. Various applications which run on different hosts or servers in the data center and exchange sensitive data with each other do so without the awareness of the one server's security profile, thereby potentially losing important, sensitive information to malware, such as PII, PCI data, HIPPA records, etc.

SUMMARY

In one embodiment, a system includes a processing circuit and logic integrated with and/or executable by the processing circuit. The logic is configured to cause the processing circuit to receive security results, using an application and data protection layer (ADPL) operating on a first host, from an end point protection agent (EPPA) configured to protect the first host. The logic is also configured to cause the processing circuit to provide the security results to one or more local applications operating on the first host.

According to another embodiment, a method includes receiving security results, using an ADPL operating on a first host, from an EPPA configured to protect the first host. The method also includes providing the security results to one or more local applications operating on the first host.

In yet another embodiment, a computer program product includes a computer readable storage medium having program instructions stored thereon. The program instructions are executable by a processing circuit to cause the processing circuit to receive security results, using an ADPL operating on a first host from an EPPA configured to protect the first host. Also, the program instructions cause the processing circuit to provide the security results to one or more local applications operating on the first host.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

DETAILED DESCRIPTION

Figure 1:
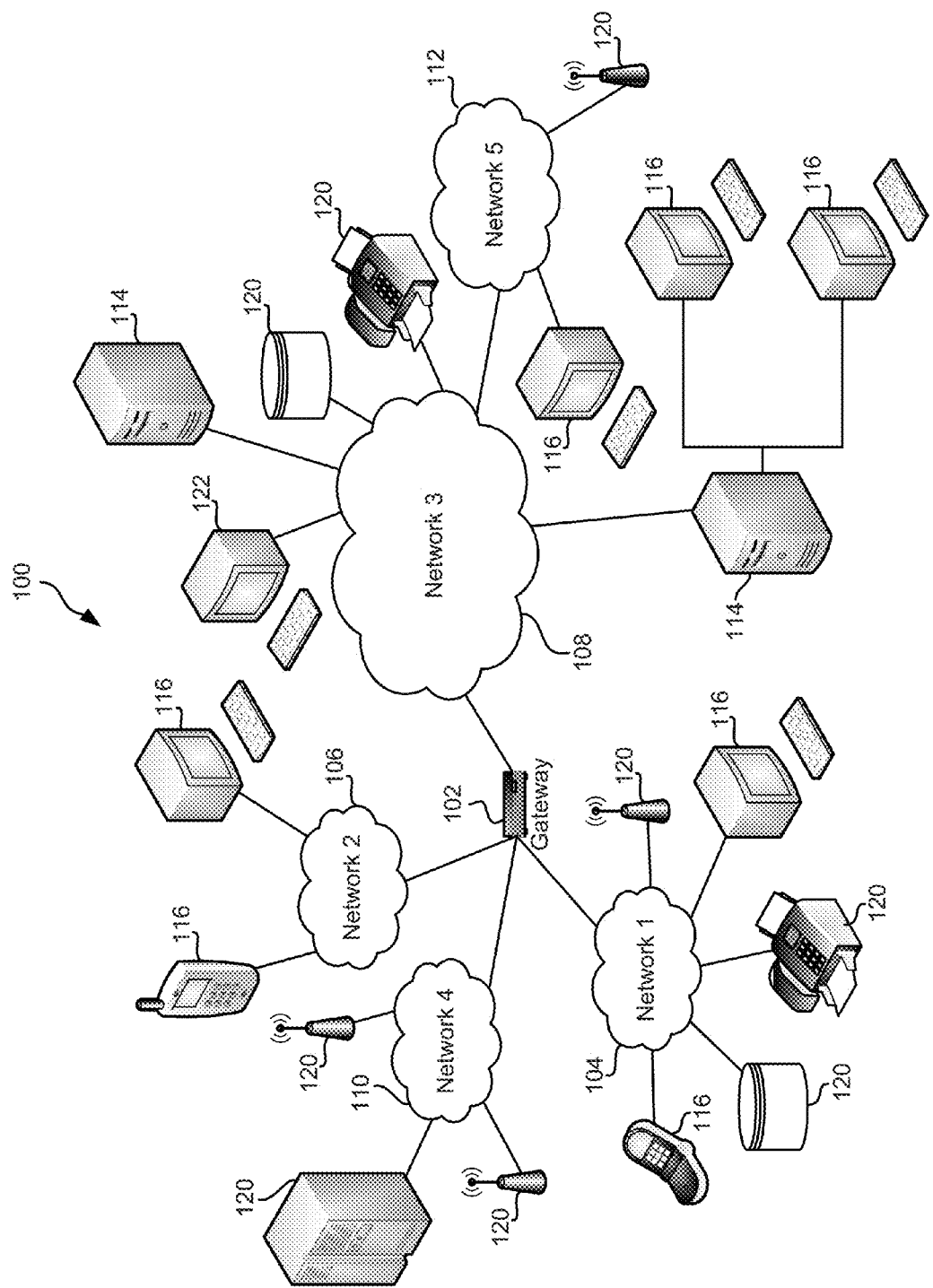
FIG. 1 shows a network architecture, according to one embodiment.

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may be implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurality of connections.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided including a first remote network 104 and a second remote network 106. A gateway 102 may be coupled between the remote networks 104, 106 and a proximate network 108. In the context of the present network architecture 100, the networks 104, 106 may each take any form including, but not limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network 110 may be a network devoted to the IOT, and may provide infrastructure and protocols for communication between all devices in the IOT, and between any devices in the IOT and the networks 104, 106. In another example, network 112 may be a network devoted to Industrial control, and may provide infrastructure and protocols for communication within and/or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture 100 is at least one data server 114 coupled to the proximate network 108, and which is accessible from the remote networks 104, 106 via the gateway 102. It should be noted that the data server(s) 114 may include any type of computing device/groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should be noted that a user device 122 may also be directly coupled to any of the networks, in one embodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system, device, and/or any device useable in a network.

According to some approaches, methods and systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments.

In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used as would be understood by those of skill in the art.

Figure 2:
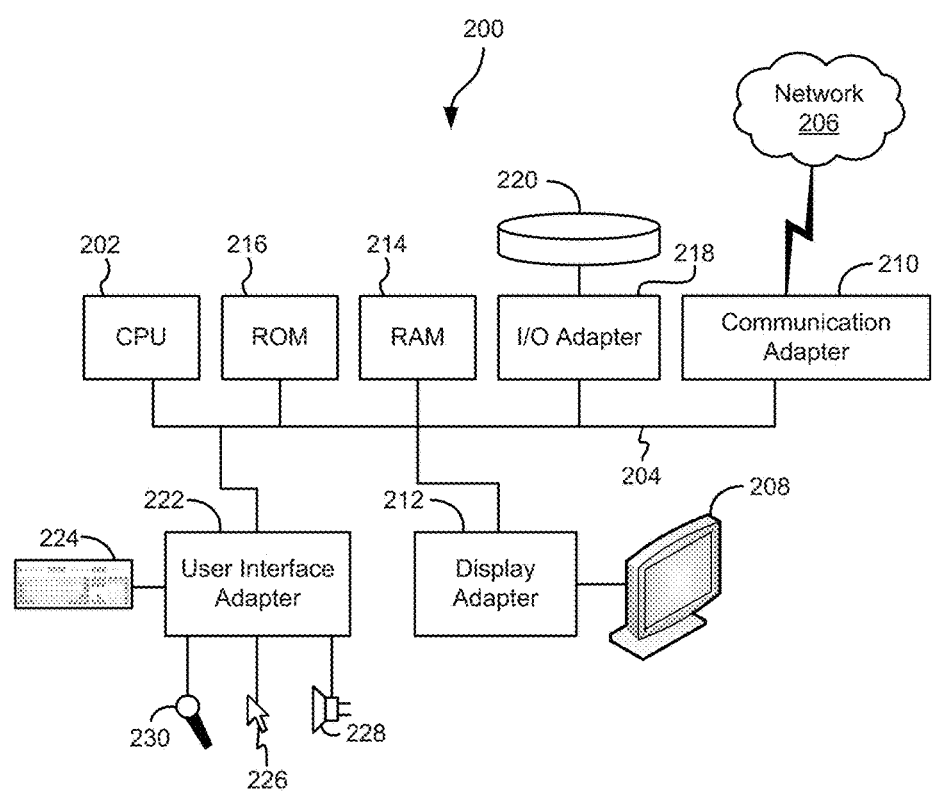
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (ROM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (not shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL, PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3:
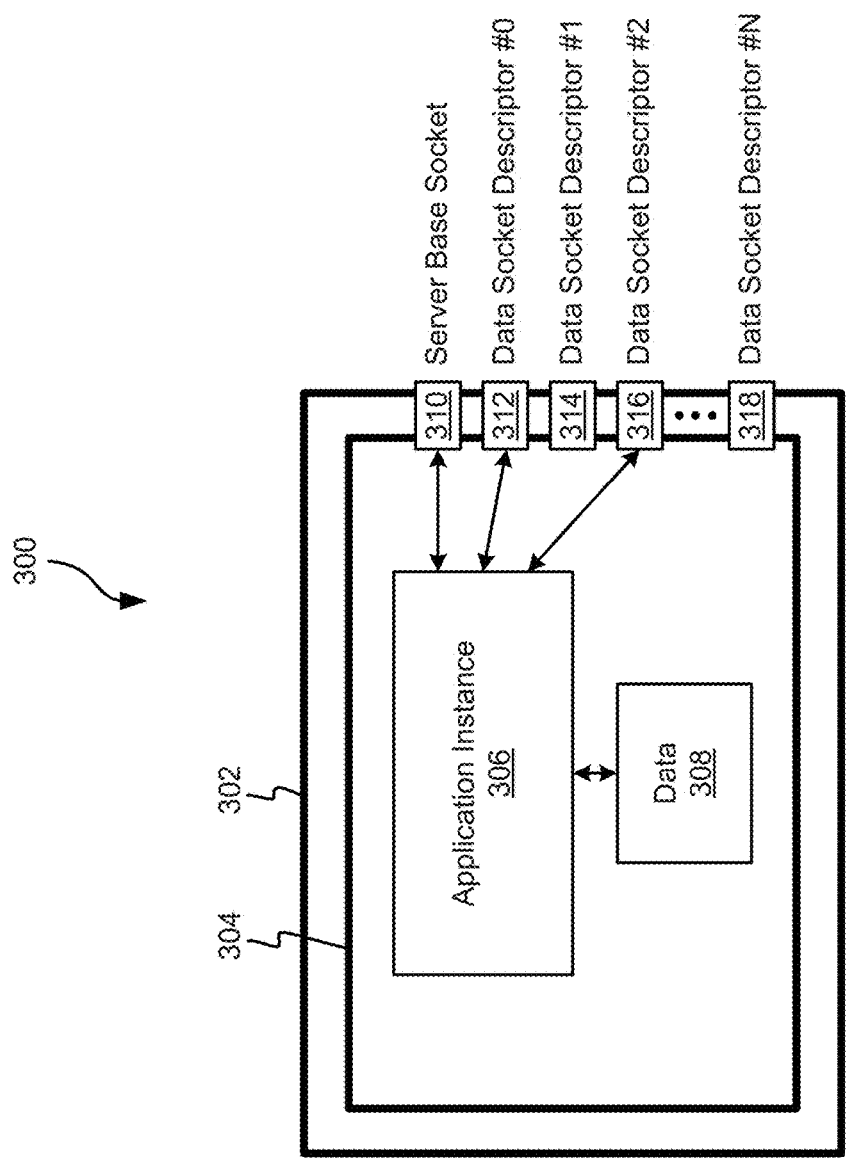
FIG. 3 shows a logical representation of an application instance operating on a computing system, in accordance with one embodiment.

Now referring to FIG. 3, a logical representation of an application instance 306 operating on a computing system 300 is shown according to one embodiment. Although only one application instance 306 and one set of data 308 is shown in FIG. 3, as would be understood by one of skill in the art, any number of application instances and groups of data may be hosted on a computing system 300, limited only by the processing power and/or other resources available to the computing system 300.

As shown in FIG. 3, an application protection layer (APL) 302 and a data protection layer (DPL) 304 are represented within the computing system 300, according to one embodiment. The application instance 306 has access to data 308 within the computing system 300. Also, the application instance 306, through any number of standard and/or custom application programming interfaces (APIs), may utilize any of a plurality of data socket descriptors (e.g., data socket descriptor #0 312, data socket descriptor #1 314, data socket descriptor #2 316, . . . , data socket descriptor #N 318) with which to communicate (send and/or receive) information outside of the application instance 306 or computing system 300. One or more server base sockets 310 is provided in the application instance 306 of computing system 300 and is used for control of the peer application instances on the computing system 300, outside the system, or outside the application instance 306 itself, as would be understood by one of skill in the art.

In order to provide application and data protection to application instances of distributed, scaled-out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS and container attributes which include server port, transport protocol, network address translation (NAT) IP address range, maximum transmission unit (MTU), application payload sizes, user programmable attributes such as multi-tenancy labels etc.

Using the above two operations, two layers of protection (application protection and data protection) are enacted together to protect the application (not shown) from which the application instance 306 is provided and any group of application instances related to the application that provides the application instance 306.

The APL 302 works with data socket APIs and data socket libraries to provide protection to application instances and to the data that is used by the application instances. While doing so, the APL 302 does not interfere with the application architecture and its normal behavior. Though these new APIs, each application instance receives extra capabilities to ensure that all flows entering and exiting the application instance are trusted flows. Moreover, the APL 302 receives additional infrastructural help by being informed about the security status of virtual and/or physical servers on which the application instance is running, along with the security status of other application instances and their virtual and/or physical servers. Based on the comprehensive status of the servers and network in the data center, the APIs provide feedback and suggest use of data protection mechanisms to protect data in memory and cache.

FIG. 3 shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the APL 302 and the DPL 304 utilize individual sets of APIs that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system.

ADPL library functions may be used by the application instance 306 to send and receive data using operating system data sockets 312, 314, 316, . . . , 318. ADPL library functions may add all security mechanisms around the socket APIs. Modules in the ADPL architecture include: a security policies database which includes secure application policies specific to E-W policies and N-S policies, and secure data policies. Additional modules include a socket descriptor database, packet processing functions, a management process, and a configuration and logging mechanism.

The ADPL uses micro-security policies with which to secure the application instance 306 and the data 308. Every ingress packet on a selected data socket descriptor (e.g., data socket descriptor #2 316) is verified against the micro-security policies. Security policies are defined as operands, actions/operations, and sub-actions.

There are two types of application security policies applied by the APL 302: E-W Policies and N-S Policies. E-W Policies dictate and limit data socket use in communications with other data sockets and/or servers within the data center. N-S Policies dictate behavior of data sockets that communicate between servers within the data center and hosts and/or servers outside the data center.

Data security policies refer to complex data-type centric policies. These policies are triggered by the security profile of the data socket based on the data socket descriptor on which data is exchanged. Based on the security profile, the data exchange is allowed, restricted, or limited. The security profile is derived from the packet options which are available via data socket options, in one embodiment.

Figure 4:
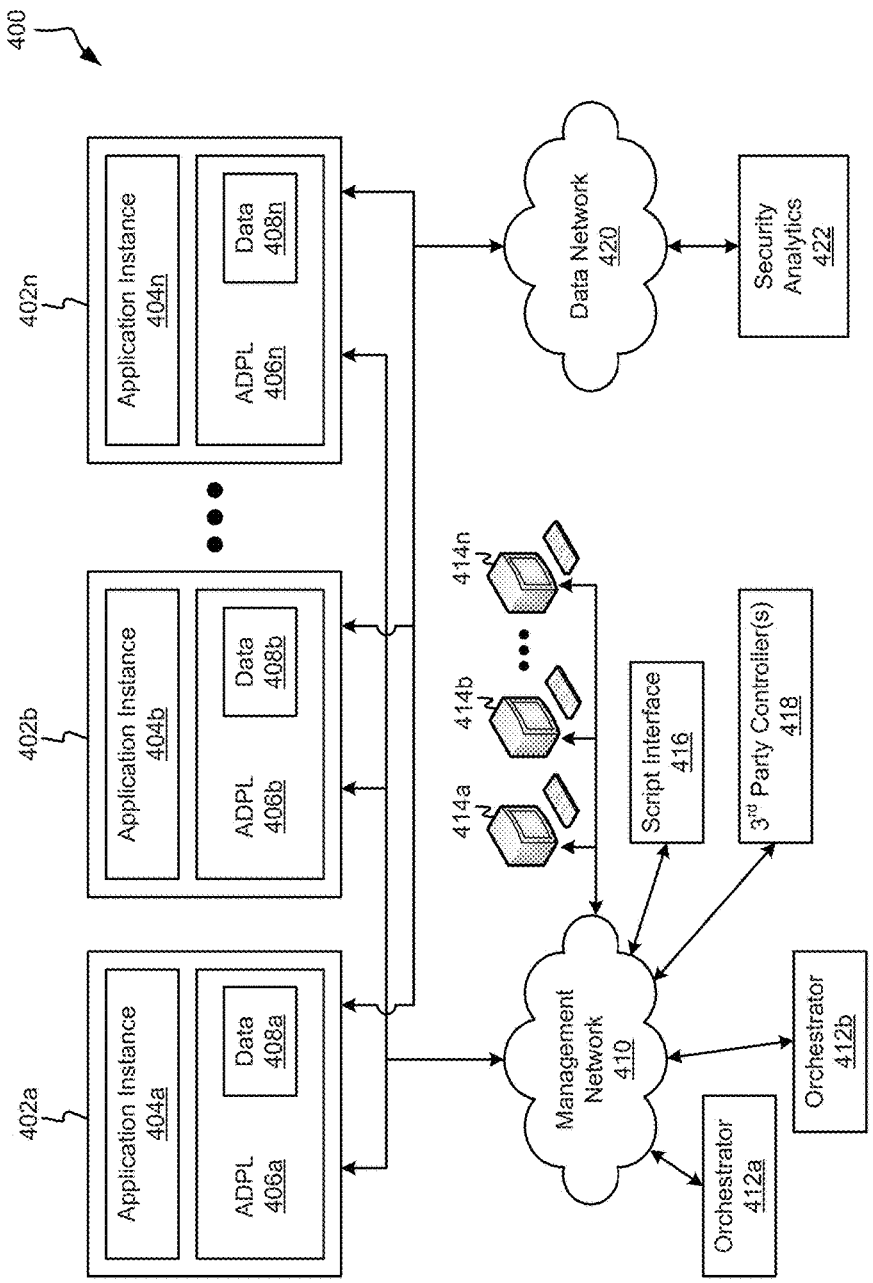
FIG. 4 shows an application and data protection library (ADPL) control model implemented in a data center, according to one embodiment

FIG. 4 shows the ADPL control model implemented in a data center 400, according to one embodiment. As shown, one or more policy orchestrators 412a, 412b is associated with the management network 410. More than one policy orchestrator may be utilized in high availability (HA) mode. Each policy orchestrator 412a, 412b may include segment management, policies management, configuration management, application tracking, a security trending controller, and software defined control.

From the management network 410, APIs, such as representational state transfer (REST) APIs (among others known in the art), may be distributed to the plurality of management consoles 414a, 414b, . . . , 414n, the scripted interface 416, and/or to one or more third party controllers 418. Each of the plurality of management consoles 414a, 414b, . . . , 414n may include a graphical interface, REST API-based programmability, trending, analysis, auditing, and third party controller integration.

One or more virtual platforms 402a, 402b, . . . , 402n host one or more ADPL-shielded application instances 404a, 404b, . . . , 404n along with data 408a, 408b, . . . , 408n utilized by each application instance 404a, 404b, . . . , 404n which are protected by ADPLs 406a, 406b, . . . , 406n.

The primary policy orchestrator 412a communicates to the one or more ADPL-shielded application instances 404a, 404b, . . . , 404n through the management network 410. Each of the ADPLs 406a, 406b, . . . , 406n operating for each individual application instance 404a, 404b, . . . , 404n may include application protection and policy enforcement, data protection and policy enforcement, and collection of statistics of normal and malicious behavior.

The data network 420 is associated with a security analytics module 422 which may include a security analytics engine and a collection of security analysis tools. In more approaches, the security analytics module 422 may include FireEye Sandbox, and/or other third party security analysis tools, from third parties such as IBM, CISCO, SYMANTEC, MCAFEE, etc. Moreover, the security analytics module 422 may provide feedback to the one or more policy orchestrators 412a, 412b.

One or more of the application instances 404a, 404b, . . . , 404n may be grouped together in pico-segments or groups that each include related socket descriptors and data socket descriptors of application instances that share characteristics based on data socket descriptors, among other characteristics. The policy orchestrator 412a, 412b interacts with the various pico-segments of application instances in which ADPL-shielded application instances 404a, 404b, . . . , 404n are grouped together as a whole, rather than with each individual application instance individually.

In order to protect applications from malicious software and application data from data breaches, a mechanism is described which allows the applications themselves to utilize the protection of EPPAs on different and possibly remote hosts or servers (virtual or physical) than the host or server on which the application is operating.

In one embodiment, one or more EPPAs in a data center are each configured to send a local security status to at least one application operating on a remote host or server in the data center. Preferably, all applications operating within the data center have the local security status sent thereto. In order to send the local security status to the applications, the local security status may be sent to each remote host or server in the data center on which applications are operating.

By using the ADPL, a security profile for each local EPPA may be sent to all applications running on a server that utilizes the ADPL. In addition, the security profile for each EPPA may also be sent to one or more, and preferably all, applications operating on remote servers in the data center. Particularly, the local security profile may be sent to all applications that have active communication sessions established with the server on which the local security profile is generated. Moreover, the remote EPPA-derived security profile of the server may be sent to any server using one or more ADPL modified APIs.

Any EPPA may be used in the data center for creation of local security profiles, from any vendor, and of any model. Moreover, a mixture of EPPAs may be installed in the data center, with the ADPL on servers of the data center being configured to interact with each EPPA through standard and/or proprietary communication protocols known in the art.

In order to accomplish this functionality, an abstraction layer in the ADPL interprets the local security profile derived by an EPPA and creates a common understanding of results included in the security profile for the servers on which the EPPA is operating.

Each application operating in the data center, upon receiving a shared security profile about a peer server, is configured to determine one or more actions to take when communicating with the identified peer server and any applications operating on the peer server. In one embodiment, at least sensitive data is not shared with the identified peer server during a time period in which the peer server reports a security risk from the EPPA, and in a further embodiment no data is shared with the identified peer server. In another embodiment, at least sensitive data may be redacted from messages sent to the identified peer server, and in a further embodiment all data not essential for the understanding of the payload may be redacted from messages sent to the identified peer server. In this way, applications are enabled to be more intelligent and self-defending on a per session basis than without this security profile sharing mechanism.

In one embodiment, socket APIs and/or libraries are used to provide protection to applications and application data. While provided such protection, the mechanism does not interfere with the application architecture and normal behavior of the application and instances thereof. Through these new socket APIs, an application is awarded extra capabilities that allow the application to obtain additional infrastructural help and knowledge.

This help and knowledge includes the security status of virtual and/or physical server(s) on which the application is operating, the security status of other peer applications and their virtual and/or physical servers, details of types of attacks that have occurred on the peer application instances, a number of times each of the peer application instances have suffered breach attempts, etc. Based on the comprehensive security status of many or all servers in the data center, and each network thereof, the APIs provide feedback per socket descriptor to the applications and also provide suggests on use of data protection mechanisms to protect clear data being exchanged with peer applications and/or clients.

Figure 5:
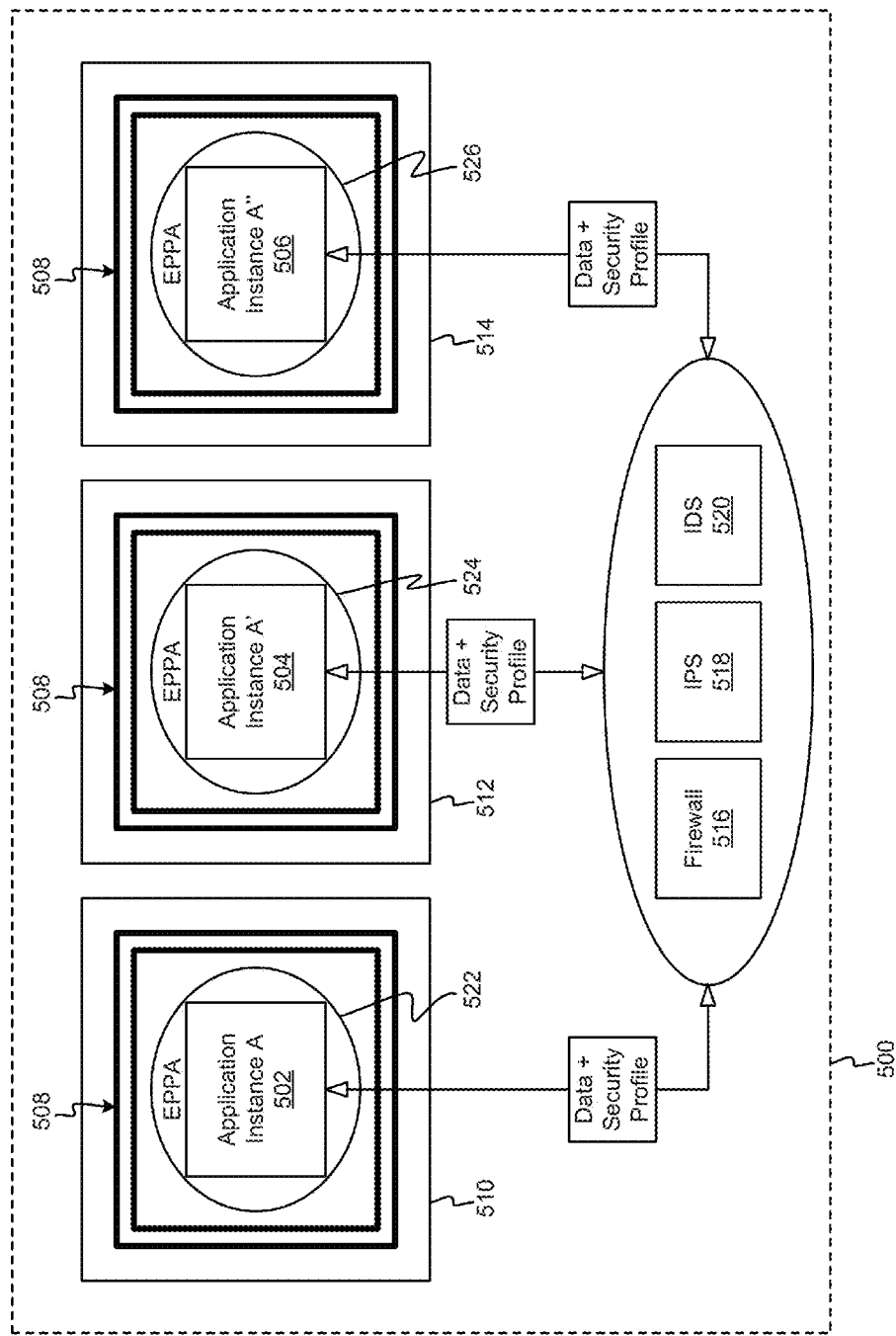
FIG. 5 shows several application instances operating in a virtual environment, according to one embodiment.

Now referring to FIG. 5, three instances of an application, Application Instance A 502, Application Instance A' 504, and Application Instance A" 506 are shown running in a virtual environment 500 on one or more virtual platforms, such as hypervisors. Many more than three instances of an application may be running in the virtual environment 500 at any one time as would be understood by one of skill in the art, on the order of thousands or millions in some cases. An ADPL 508 provided by secure APIs called by the hosts, Host A 510, Host B 512, and Host C 514, enables application protection via policies and also provides data protection by sharing a security status and security profile with any peer application instances operating on other hosts (Application Instance A 502 is a peer to Application Instance A' 504, Application Instance A' 504 is a peer to Application Instance A" 506, Application Instance A" 506 is a peer to Application Instance A 502, and so forth). Using the security profile of the peer application instance, the protected application instance is provided the capability to apply various data security mechanisms to protect itself from malicious code and data breach attacks.

Each instance of the application (e.g., Application Instance A 502, Application Instance A' 504, Application Instance A" 506, etc.) may run on the same physical machine or on different physical or virtual machines in the data center. However, all the application instances communicate with each other to share data and other information to satisfy queries.

New socket APIs and data protection APIs that are utilized to provide the protection do not disturb any intermediate security appliances used in the network and/or on the servers or hosts, such as a firewall 516, an Intrusion Prevention System (IPS) 518, an Intrusion Detection System (IDS) 520, etc.

The ADPL 508 around the socket descriptors for database applications creates a mapping of security profile policies with the application per data socket descriptor to perform various security feature functionality, such as dynamic cache flush, dynamic data redaction, locking of in-memory database(s), etc. These security features are configured to be applied on a per application instance per session basis. As a result, a database server is allowed to enact a dynamic security feature depending upon the security profile of that particular session at that time, thereby avoiding cache scraping, data breaches, or other unwanted intrusion by malware or nefarious applications.

An EPPA 522 on Host A 510 creates security results which indicate the presence of one or more risks to Host A 510. The ADPL 508 interprets the security results provided by the EPPA 522 operating on Host A 510, and shares these interpreted security results with Application Instance A 502.

A similar mechanism is provided on with EPPA 524 on Host B 512, and EPPA 526 on Host C 514. The ADPL 508 also interprets the security results provided by the EPPA 524 operating on Host B 512, and shares these interpreted security results with Application Instance A' 504, and interprets the security results provided by the EPPA 526 operating on Host C 514, and shares these interpreted security results with Application Instance A" 506.

Moreover, according to one embodiment, the ADPL 508 is configured to share the interpreted security results of EPPA 522 operating on Host A 510 with Host B 512 and Host C 514, along with Application Instance A' 504, Application Instance A" 506, and any other applications operating on Host A 510, Host B 512, and Host C 514.

In another embodiment, the ADPL 508 is configured to share the interpreted security results of EPPA 524 operating on Host B 512 with Host A 510 and Host C 514, along with Application Instance A 502, Application Instance A" 506, and any other applications operating on Host A 510, Host B 512, and Host C 514.

According to another embodiment, the ADPL 508 is configured to share the interpreted security results of EPPA 526 operating on Host C 514 with Host A 510 and Host B 512, along with Application Instance A 502, Application Instance A' 504, and any other applications operating on Host A 510, Host B 512, and Host C 514.

In one embodiment, the interpreted security results may include a security profile range that is indicated by the ADPL 508 to the other applications and/or hosts in the data center. The security profile range may utilize a color scheme, in one embodiment. For example, the security profile range may take on the colors of red, yellow, green, and normal.

According to one embodiment, the security profile range may account for the presence and/or detection of one or more of the following risk types: malware presence, virus presence, rogue security software, Trojan horse, malicious spyware, computer worm, botnet, spam incidences, phishing incidence, rootkit (the tool kit used to obtain administrative privileges), outdated version of EPPA, etc.

The security profile range may be calculated as a sum of percentages of individual risk/security parameters on a per-server per-socket descriptor basis. Some risk/security parameters may be provided by, but are not limited to being obtained from, a library mechanism executed in the ADPL 508 that evaluates various attempted and/or foiled attacks on the application instance to provide risk assessment, one of the EPPAs 522, 524, 526, e.g., products from SYMANTEC, MCAFEE, KASPERSKY, etc., where the EPPA may derive the risk assessment using a signature based mechanism, behavior analysis based mechanism, neural network based mechanism, etc., along with other sources included in the application instance, the host, or provided by the user.

With the availability of mapping between the security profiles of each data socket descriptor and security policy, a new dynamic is created for use by the ADPL 508. With this mechanism, the security profile for an individual session may be provided to an associated application by the underlying protection layer by the use of various standard and/or specialized socket APIs like getsockopt( ), adpl_getsockopt( ), etc. Based on application requirements, these APIs may be called by the ADPL 508 to understand the security profile of the session and any suggested actions included in the security policy.

Figure 6:
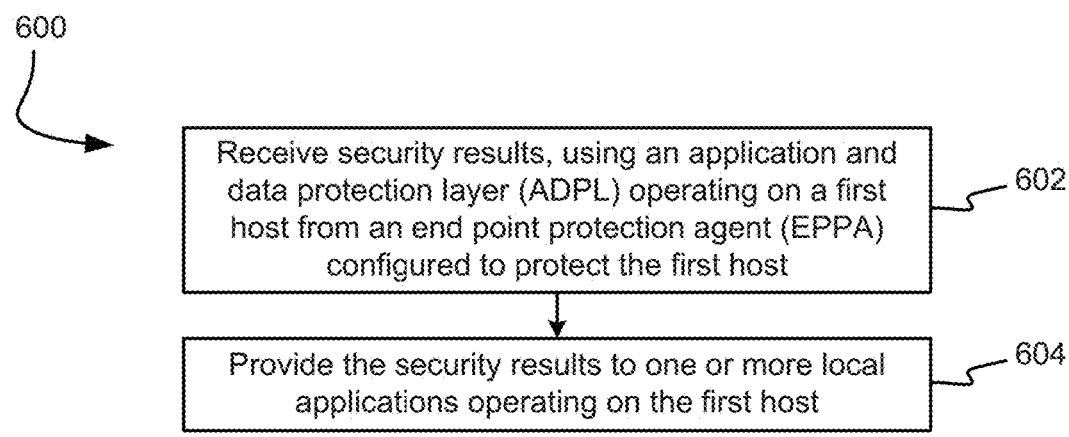
FIG. 6 shows a flowchart of a method, according to one embodiment.

Now referring to FIG. 6, a flowchart of a method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be apparent to one of skill in the art upon reading the present descriptions.

Each of the steps of the method 600 may be performed by any suitable component of the operating environment. For example, in various embodiments, the method 600 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 600. Illustrative processing units include, but are not limited to, a central processing unit (CPU), an ASIC, a FPGA, etc., combinations thereof, or any other suitable computing device known in the art.

As shown in FIG. 6, method 600 may initiate with operation 602, where security results are received from an EPPA using an ADPL operating on a first host. The EPPA is configured to protect the first host. Any EPPA, security appliance, protection device, or mechanism may produce the security results. Thereafter, the ADPL may obtain the security results in any manner, such as pulling the security results from the EPPA, receiving a message from the EPPA having the security results included therein, interpreting information exchanged by the EPPA with other portions of the first host, etc. The ADPL may, in one embodiment, interface with the EPPA using one or more standard or specialized APIs to obtain the security results.

In operation 604, the security results are provided to one or more local applications operating on the first host. The ADPL may provide these security results to the one or more local applications via one or more standard or specialized APIs, through direct messaging, or some other mechanism known in the art.

In one embodiment, method 600 may further include interpreting the security results of the EPPA using the ADPL in order to produce a security profile range. The security profile range may be color-based as previously described, or may be based on any predetermined scheme, criteria, or parameters that are interpretable by the ADPL on the first host and any applications the security profile is sent. Moreover, the security profile range is provided to the one or more local applications operating on the first host. In this way, each application on the first host is provided with the information about risks or threats that have been detected by the EPPA operating on the first host.

In another embodiment, method 600 may include mapping action parameters of at least one data socket descriptor based security policy using the security profile range as a basis for these action parameters. This mapping may be used to determine actions to perform in response to subsequent security profiles and/or security profile ranges being received. Thereafter, appropriate action parameters are sent by the ADPL to a local application designated by the at least one data socket descriptor based security policy. In this way, the local application is provided the information that enables it to respond to detected security risks in a predetermined way (perform one or more actions).

In a further embodiment, method 600 may include sending the security results to one or more peer ADPLs operating on other hosts in communication with the first host. In this way, other ADPLs are provided with the detected risks and/or threats affecting the first host, so that they can respond appropriately to the risk/threat, such as by performing one or more predetermined actions (possibly based on a policy mapping).

Moreover, in another embodiment, method 600 may include receiving one or more security profiles from at least one peer ADPL operating on another host via a communication session or a communication channel. The communication session or a communication channel may utilize a data socket descriptor on which a socket descriptor-based security policy is enacted. The one or more security profiles from the peer ADPL may be provided in response to an EPPA configured to protect the other host on which the peer ADPPL is operating providing a security profile for the other host which indicates one or more risks/threats affecting the other host.

Method 600 may further include interpreting the one or more security profiles provided to the ADPL by the peer ADPL to apply to at least one local application operating on the first host. Then, the ADPL may send the one or more security profiles and/or interpreted security profiles to the at least one local application operating on the first host through one or more standard and/or specialized APIs.

In yet another embodiment, method 600 may include receiving a plurality of security profiles from heterogeneous EPPAs protecting other hosts. These heterogeneous EPPAs may operate on different hosts, may be of different types, may be configured to perform different functions, may be from different vendors, etc.

Method 600 may also include interpreting the plurality of security profiles to determine which local applications operating on the first host are affected by at least one of the plurality of security profiles and which action to perform in response to one or more of the plurality of security profiles. This determination may be based on a severity of the risk/threat indicated by the security profiles, and which applications are most vulnerable to the specific types of risks/threats indicated by the security profiles.

According to a further embodiment, method 600 may include applying actions dictated by a policy mapping based on the plurality of security profiles to one or more affected local applications differently based on individual requirements of each of the one or more affected local applications.

In additional embodiments, ADPL suggested actions may be received and mapped to application-specific policies or rules including one or more security policies. Then, these mapped policies may be applied dynamically to a particular session or data socket descriptor on a per-user basis.

In one approach, all security results may be collected from heterogeneous EPPAs running on different hosts (both virtual and physical). The EPPAs may be from different vendors or manufacturers, use different technologies, use different principles and approaches, etc. These heterogeneous security results may be interpreted differently for different scaled-out and distributed applications and application instances operating on hosts according to the requirements of the applications and application instances, and policies related to those applications and application instances.

Moreover, security results may be selectively obtained from only those security appliances and EPPAs to which the best results are typically obtained, and security policies may be enacted based on these selected security results, while limiting the power of security profiles from less trustworthy or lower performing EPPAs.

Method 600 may be implemented as a system, process, or a computer program product. For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 600, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 600 in one embodiment.

Variations of the systems, methods, and computer program products described herein are also possible, and the explicit description thereof in this document is not required in order to provide those of skill in the art with the ability to conceive of such variations when reading the present descriptions.

What is claimed is:

1. A system, comprising:
a processing circuit and logic integrated with and/or executable by the processing circuit, the logic being configured to cause the processing circuit to:
receive security results, using an application and data protection layer (ADPL) operating on a first host, from an end point protection agent (EPPA) configured to protect the first host;
provide the security results to one or more local applications operating on the first host;
interpret the security results of the EPPA using the ADPL to produce a security profile range, wherein the security profile range is calculated based on individual risk/security parameters on a per-server per-socket descriptor basis;
provide the security profile range to the one or more local applications operating on the first host;
map action parameters of at least one data socket descriptor based security policy using the security profile range; and
send, by the ADPL, appropriate action parameters to a local application designated by the at least one data socket descriptor based security policy.

2. The system as recited in claim 1, wherein the logic further causes the processing circuit to:
send the security results to one or more peer ADPLs operating on other hosts in communication with the first host.

3. The system as recited in claim 1, wherein the logic further causes the processing circuit to:
receive one or more security profiles from at least one peer ADPL operating on another host via a communication session or a communication channel;
interpret the one or more security profiles to apply to at least one local application operating on the first host; and
send the one or more security profiles and/or interpreted security profiles to the at least one local application operating on the first host through one or more application programming interfaces (APIs).

4. The system as recited in claim 1, wherein the logic further causes the processing circuit to:
receive a plurality of security profiles from heterogeneous EPPAs protecting other hosts;
interpret the plurality of security profiles to determine which local applications operating on the first host are affected by at least one of the plurality of security profiles and which action to perform in response to one or more of the plurality of security profiles; and
apply actions dictated by a policy mapping based on the plurality of security profiles to one or more affected local applications differently based on individual requirements of each of the one or more affected local applications.

5. The system as recited in claim 1, wherein the security profile range is calculated as a sum of percentages of the individual risk/security parameters on the per-server per-socket descriptor basis, and wherein the security profile range accounts for detection of one or more security risks selected from a group comprising: malware presence, virus presence, rogue security software, Trojan horse, malicious spyware, computer worm, botnet, spam incidence, phishing incidence, rootkit, and an outdated version of the EPPA.

6. A method, comprising:
receiving security results, using an application and data protection layer (ADPL) operating on a first host, from an end point protection agent (EPPA) configured to protect the first host;
providing the security results to one or more local applications operating on the first host;
interpreting the security results of the EPPA using the ADPL to produce a security profile range, wherein the security profile range is calculated based on individual risk/security parameters on a per-server per-socket descriptor basis;
providing the security profile range to the one or more local applications operating on the first host;
mapping action parameters of at least one data socket descriptor based security policy using the security profile range; and
sending, by the ADPL, appropriate action parameters to a local application designated by the at least one data socket descriptor based security policy.

7. The method as recited in claim 6, further comprising:
sending the security results to one or more peer ADPLs operating on other hosts in communication with the first host.

8. The method as recited in claim 6, further comprising:
receiving one or more security profiles from at least one peer ADPL operating on another host via a communication session or a communication channel;
interpreting the one or more security profiles to apply to at least one local application operating on the first host; and
sending the one or more security profiles and/or interpreted security profiles to the at least one local application operating on the first host through one or more application programming interfaces (APIs).

9. The method as recited in claim 6, further comprising:
receiving a plurality of security profiles from heterogeneous EPPAs protecting other hosts;
interpreting the plurality of security profiles to determine which local applications operating on the first host are affected by at least one of the plurality of security profiles and which action to perform in response to one or more of the plurality of security profiles; and
applying actions dictated by a policy mapping based on the plurality of security profiles to one or more affected local applications differently based on individual requirements of each of the one or more affected local applications.

10. The method as recited in claim 6, wherein the security profile range is calculated as a sum of percentages of the individual risk/security parameters on the per-server per-socket descriptor basis, and wherein the security profile range accounts for detection of one or more security risks selected from a group comprising: malware presence, virus presence, rogue security software, Trojan horse, malicious spyware, computer worm, botnet, spam incidence, phishing incidence, rootkit, and an outdated version of the EPPA.

11. A computer program product, comprising a computer readable storage medium having program instructions stored thereon, the program instructions being executable by a processing circuit to cause the processing circuit to:
- receive security results, using an application and data protection layer (ADPL) operating on a first host from an end point protection agent (EPPA) configured to protect the first host;
- provide the security results to one or more local applications operating on the first host;
- interpret the security results of the EPPA using the ADPL to produce a security profile range, wherein the security profile range is calculated based on individual risk/security parameters on a per-server per-socket descriptor basis;
- provide the security profile range to the one or more local applications operating on the first host;
- map action parameters of at least one data socket descriptor based security policy using the security profile range; and
- send, by the ADPL, appropriate action parameters to a local application designated by the at least one data socket descriptor based security policy.

12. The computer program product as recited in claim 11, wherein the program instructions further cause the processing circuit to:
- send the security results to one or more peer ADPLs operating on other hosts in communication with the first host.

13. The computer program product as recited in claim 11, wherein the program instructions further cause the processing circuit to:
- receive one or more security profiles from at least one peer ADPL operating on another host via a communication session or a communication channel;
- interpret the one or more security profiles to apply to at least one local application operating on the first host; and
- send the one or more security profiles and/or interpreted security profiles to the at least one local application operating on the first host through one or more application programming interfaces (APIs).

14. The computer program product as recited in claim 11, wherein the program instructions further cause the processing circuit to:
- receive a plurality of security profiles from heterogeneous EPPAs protecting other hosts;
- interpret the plurality of security profiles to determine which local applications operating on the first host are affected by at least one of the plurality of security profiles and which action to perform in response to one or more of the plurality of security profiles; and
- apply actions dictated by a policy mapping based on the plurality of security profiles to one or more affected local applications differently based on individual requirements of each of the one or more affected local applications.

* * * * *